United States Patent

Chiang

[11] Patent Number: 6,037,430
[45] Date of Patent: Mar. 14, 2000

[54] RADIATION STERILIZABLE PRESSURE SENSITIVE ADHESIVES

[75] Inventor: Ken J. Chiang, Longmeadow, Mass.

[73] Assignee: Solutia Inc., Springfield, Mass.

[21] Appl. No.: 08/140,840

[22] Filed: Oct. 25, 1993

[51] Int. Cl.$^7$ ..................... C08F 22/10
[52] U.S. Cl. ........................ 526/318.4
[58] Field of Search ............ 526/318.4

[56] References Cited

U.S. PATENT DOCUMENTS

| | | |
|---|---|---|
| 3,691,140 | 9/1972 | Silver ....................... 526/240 |
| 3,740,366 | 6/1973 | Anderson et al. ............ 526/318.4 |
| 4,181,752 | 1/1980 | Martens et al. ............. 526/318.4 |
| 4,952,650 | 8/1990 | Young et al. ............... 526/318.4 |
| 5,130,375 | 7/1992 | Bernard et al. . |
| 5,183,459 | 2/1993 | Bernard . |
| 5,194,486 | 3/1993 | Levine et al. . |
| 5,196,468 | 3/1993 | Schwerzel et al. . |
| 5,196,504 | 3/1993 | Scholz et al. . |
| 5,216,060 | 6/1993 | Keating et al. . |

FOREIGN PATENT DOCUMENTS

| | | | |
|---|---|---|---|
| 60-235815 | 11/1985 | Japan | ................... 526/318.4 |
| 4-23808 | 1/1992 | Japan | ................... 526/318.4 |

*Primary Examiner*—David W. Wu
*Assistant Examiner*—N. Sarofim
*Attorney, Agent, or Firm*—Michael J. Murphy

[57] ABSTRACT

A method of improving the strength properties of acrylic-based pressure sensitive resins exposed to sterilizing radiation by using, during interpolymerization of the monomers of the resin, an amount of chain transfer agent adequate to reduce the gel content of the resin to an extent effective to counteract the gain in gel content occurring after exposure to such radiation. The gel content of the resin composition, as made, is no more than about 2.0%.

4 Claims, No Drawings

RADIATION STERILIZABLE PRESSURE SENSITIVE ADHESIVES

BACKGROUND OF THE INVENTION

This invention relates to pressure sensitive adhesives (PSA's) and more particularly to radiation-friendly resins for use therein and to process improvements for making such resins.

PSA's are widely used in medical applications such as, for example, adhering a bandage to the skin of a patient. In one approach to preparing the bandage, liquid PSA is coated on a release liner, then the liquid is evaporated and the dry coating of pressure sensitive resin (sometimes referred to herein as "pressure sensitive interpolymer") transferred to a bandage substrate. The components of the medical formulation are next applied to the exposed coating followed by covering with another release layer to form the bandage. In use the covering is peeled away and the bandage pressed against and held on the skin by the pressure sensitive resin of the PSA.

Sterilizing the bandage for hygenic purposes to kill bacteria before use is standard practice, with exposure to radiation such as electron beam being used for procedural simplicity. Prior art adhesive compositions, however, are radiation-sensitive in that their strength properties are adversely affected, typically becoming too brittle, resulting in weak adherence of the bandage to the user's skin. Inclusion of additives in the PSA formulation intended to scavenge undesirable by-products generated during irradiation have been unsuccessful since adversely affecting peel adhesion of the PSA.

SUMMARY OF THE INVENTION

Now improvements have been made to PSA's to substantially alleviate a well-defined continuing need in the prior art—i.e. overcoming the harmful effects on performance of exposure to radiation.

Accordingly, a principal object of this invention is to improve the radiation performance of resins used in PSA formulations.

Another object is to provide an E-beam compatible pressure sensitive resin for use in medical (e.g. bandage) applications.

A specific object is to provide a pressure sensitive adhesive resin which, after irradiation, is substantially indistinguishable in strength properties from pressure sensitive adhesive resins which would be usable without irradiation.

Other objects of this invention will in part be obvious and will in part appear from the following detailed description and claims.

These and other objects are accomplished by a method of improving the strength properties of acrylic-based pressure sensitive resins exposed to sterilizing radiation which comprises using, during interpolymerization of the monomers of the resin, an amount of chain transfer agent (CTA) adequate to reduce the gel content of the resin to an extent effective to counteract the gain in gel content occurring during exposure to such radiation.

Also provided is a pressure sensitive, radiation sterilizable intermediate resin composition comprising: a) an acrylic emulsion interpolymer having a glass transition temperature less than about 0° C., and b) one or more chain transfer agents, wherein the content of the chain transfer agent is set to provide a gel content of the resin composition of no more than about 2.0% preferably no more than 1.5%. Such low gel content differentiates the resin of the invention from the usually higher gel contents of previously known emulsion-type pressure sensitive resins.

In another aspect there is provided in the process of emulsion polymerizing acrylate monomers to form a pressure sensitive interpolymer having a glass transition temperature of less than about 0° C., the improvement which comprises using a chain transfer agent to control the gel content of the interpolymer to no more than about 2.0%.

DETAILED DESCRIPTION OF THE INVENTION

To avoid deterioration in PSA performance properties caused by radiation-induced crosslinking from exposure to sterilizing radiation, the invention uses a precise amount of CTA during interpolymerization of the monomers of the pressure sensitive resin of the PSA. The unmodified interpolymer resin as first formed is in the nature of an intermediate since before irradiation it is normally ineffective as too soft and therefore too weakly adherable for most conventional PSA applications. The invention compensates for the radiation-induced increase in molecular weight of the unirradiated interpolymer to provide, after exposure, an irradiated interpolymer having acceptable strength (peel and shear) performance properties in the PSA application. Gel content is the property of the interpolymer defining effectiveness of the CTA. To provide acceptable performance properties in the irradiated interpolymer, the regulated amount of CTA used must be adequate to reduce the gel content to an extent effective to counteract or substantially match its gain after exposure to radiation. Thus, the initially low gel content is, after irradiation, acceptable at a level on the order of at least about 50%. The final interpolymer, then, which is intended for hygenic use in medical applications has been purposely modified from its original, as made condition as a result of exposure to the radiation so as to be substantially indistinguishable in strength properties from an interpolymer usable in these applications which had not been irradiated. Generally the gel content reduction is about 90–100% of its gain after irradiation with typical electron beam sterilizing dosage levels of about 2.5 to about 6 Mrad. This provides a gel content of no more than about 2.0% preferably no more than 1.5% of the unirradiated interpolymer resin, requiring during interpolymerization, a CTA concentration (based on the weight of interpolymerizable monomers) of more than 0 up to about 2 weight %, preferably 0.01 to 0.1 weight %. At CTA concentrations greater than about 2%, the irradiated interpolymer is generally unacceptable as too sticky—i.e. both peel and shear properties are too low.

Any CTA (including CTA mixtures) can be used which is soluble in the monomers of the interpolymer or the water of the emulsion. Usable CTA's include alkylmercaptans such as n-dodecyl mercaptan or t-dodecyl mercaptan, alkylthiols such as ethanethiol, butanethiol, octanethiol, n-dodecanethiol. Other sulfur-containing compounds such as octadecylthiol; also carbon tetrabromide, pentathenylethane and the like. 1-do-decanethiol is preferred.

Acrylic interpolymers usable in the invention have a glass transition temperatures less than 0° C., preferably between minus 5 and minus 20° C. and comprise one or more acrylate monomers such as alkyl acrylate monomers containing $C_4$ to $C_{12}$ alkyl groups, e.g. butyl acrylate, 2-ethyl hexyl acrylate, isooctylacrylate and the like. Optionally usable are copolymerizable $C_1$–$C_3$ alkyl acrylates and $C_1$–$C_3$ alkyl methacrylates such as methyl methacrylate, also copolymerizable vinyl unsaturated monomers such as vinyl acetate, styrene, acrylonitrile and the like and unsaturated carboxylic acids such as acrylic acid, methacrylic acids, fumaric and itaconic acid and the like. Also usable are isomeric acrylates such as tert-butyl acrylate, isopropyl acrylate and the like and methacrylates such as normal or tert-butyl methacrylate and the like.

A pressure sensitive interpolymer composition preferred for medial applications comprises, on a weight basis, 35–99% $C_1$ to $C_{12}$ alkyl acrylate preferably a mixture of butyl acrylate and methyl acrylate, 0 to 35% vinyl unsaturated monomer, preferably vinyl acetate, and 0–5% unsaturated carboxylic acid, preferably acrylic acid. Preferably the $C_1$ to $C_{12}$ alkyl acrylates in amount are the predominant monomer(s) comprising about 50 to about 96% by weight of the total interpolymerized monomers of the interpolymer.

The interpolymers are prepared by conventional emulsion polymerization using water-soluble or oil-soluble free radical initiator systems or with redox initiator systems in the presence of ionic and non-ionic surfactants. The amount of surfactant is sufficient to provide an average size of 0.1 to 0.8 microns to the emulsion particles and is usually from 0.3 to 3% of the aqueous emulsion. The concentration of interpolymer in the aqueous latex emulsion is between 30 to 70, preferably 40 to 65% by weight to provide adequate viscosity for ease of coating and sufficient solids content for economy.

Latex emulsions containing the modified acrylic interpolymers of the invention may also contain conventional additives such as foam suppressants, thickeners, plasticizers and the like. Crosslinking agents are preferably not used.

Sterilization of substrates bearing the pressure sensitive interpolymers of the invention is accomplished by exposure to any of various forms of radiation. Beta and gamma sources are usable with electron beam (E-beam) radiation preferred where dosages are delivered rapidly and controlled by time of exposure. Typical E-beam dosages considered adequate for hygienic sterilization are about 2.5 to about 6 megarads.

Properties of pressure sensitive resins reported in the Examples are measured according to the following procedures.

1) PSA 180° Angle Dynamic Peel. The pressure sensitive resin emulsions are cast on silicone release paper and the cast films dried at room temperature for 15 minutes and then at 90° C. for 5 minutes. The dried films (1 to 1.5 mil, 0.25 to 0.038 mm thick) are cooled to room temperature and applied to vinyl (PVC) film (3.0 mil, 0.075 mm thick) obtained from Colorite Plastic Co. as Intex®. The coated film is then E-beam treated or not as appropriate. Then the treated material is cut into one inch (2.5 cm) strips, 6 in (15.2 cm) long and the strips conditioned at 20° C., 50% R.H. for 24 hours. The release paper is removed and the strips are applied to a stainless steel plate (2 strips per plate) with an automated 4.5 lb (2.0 Kg) Pressure Sensitive Tape Council (PSTC) rolldown apparatus, once in both directions. A bond dwell time of 20 min. is allowed before peeling. Average Peel strength in lbs/in is determined on an Instron Test Machine by peeling a strip from a plate at a 180° angle at a rate of 12 in (30.5 cm) per min.

2) Shear Strength. Samples are prepared as noted above through E-beam exposure. 1 in (2.5 cm) wide strips are cut and polyester (for strength reinforcement) overlaminated to the PVC. With a 1 in. overlap, the coated polyester/PVC strip is bonded to the vertical edge of a flat stainless steel panel. The panel is then placed on the PSTC rolldown apparatus and one double pass applied for each specimen. After the double pass, a dwell period of 30 min. is allowed and then a static load of 10 oz. (0.3 kg) is attached to the lower end of the strip and allowed to hang at 22° C. to bond failure. The time (in hours) to failure is noted.

3) Gel Content. The emulsion sample is poured into a weighing dish and air dried (3 days) to provide a 2½–3 mm thick film, followed by overnight retention at 40–50° C. in a vacuum oven. The dish and sample is chilled with dry ice (5 min), the film peeled from the dish, placed between two release liners and exposed to E-beam radiation. The release liners are removed and the irradiated film heat sealed between two pieces of porous (0.45 μm pore size) polytetrafluoroethylene membranes, 47 mm diameter and placed in a jar containing methyl ethyl ketone (MEK) and shaken for 24 hours. The MEK is decanted, replaced with fresh MEK and shaken for another 24 hours. The sample is vacuum dried for 12 hours and the weight of undissolved gel measured and reported as percentage of the original weight.

Exemplary of the invention are the following specific Examples wherein all parts and percentages are by weight unless otherwise indicated.

EXAMPLE 1

Preparation of Interpolymer

A) The following ingredients are added at ambient temperature to a tank equipped with a high speed agitator and stirred until a viscous gel forms:

|  | Parts |
| --- | --- |
| Water | 9.55 |
| Surfactant A[1] | 1.03 |
| Surfactant B[2] | 0.60 |
| Surfactant C[3] | 0.30 |
| Butyl acrylate | 54.45 |
| Methyl acrylate | 6.69 |
| Vinyl acetate | 2.23 |
| Acrylic acid | 0.32 |
| 1-Dodecanethiol (CTA) | 0.03 |

[1]30% water solution; Abex ® EP-120 from Rhone Poulenc.
[2]70% water solution; Triton ® X-305 from Union Carbide.
[3]75% water solution; Aerosol ® OT from Cytec Industries.

B) The following ingredients are separately charged to a stirred polymerization reactor:

|  | Parts |
| --- | --- |
| Water | 24.03 |
| Sodium bicarbonate | 0.15 | and heated to 79° C. when 0.30 parts ammonium persulfate is added and the contents held for 15 min. at 79° C. Then the viscous gel of A) above is charged continuously at a constant flow rate over 210 min. As emulsion interpolymerization proceeds, the temperature of the reactor contents gradually increases to 82° C. and is held at this temperature for 45 min. followed by cooling to 55° C. 0.02 parts of 90% water solution of tert-butylhydroperoxide and 0.02 parts reducing agent as Parolite® from Henkel (i.e. zinc sulfoxylate formaldehyde) are then charged and the contents held for an additional 30 min. at 55° C. followed by cooling to room temperature and addition of 0.3 parts (80% water solution) defoamer (Bubble Breaker 3056A from Witco) to form the aqueous interpolymer emulsion. Solids content is 64%, Brookfield viscosity is 700–950 cps (0.7–0.95 Pa-s) and pH is 4.2–4.5.

EXAMPLES 2–7

Evaluation of Pressure Sensitive Resin Emulsions

Using the tests and measurement units described above and the polymerization recipe of Example 1 at various concentrations of chain transfer agent (CTA amount as % based on total emulsion recipe) and at various E-beam radiation dosages, the results in Table 1 are obtained. In the Table GC means gel content, PS20 means peel strength after 20 minutes, SS means shear strength and M rad means megarads. A blank under SS means the hanging weight did not detach at all which means SS is too high and the sample unacceptably brittle.

Radiation is generated by a 2.8 Mev E-beam accelerator of 0.8 Mamp beam intensity, having a 15 in (38 cm) scan width with 6 in (15.2 cm) distance from accelerator to target.

lated product composition) are intended to scavenge radicals generated during irradiation, thereby avoiding or minimizing deterioration of performance properties (peel adhesion and shear strength) of the pressure sensitive resin. Shear strength is measured using a 2 pound (8.9 kg) weight and a PVC substrate from Colorite as Colorite for the PSA with a contact area and overhang (from the edge of the stainless plate) of 1 inch and 1 inch respectively. E-beam dosage is 6 Mrad. Results using Tinuvins® 123 (registered trademark of Ciba Geigy) (T-123) as the additive are as follows:

TABLE 1

| | | Radiation Dose (MRad) | | | | | | | | | | | |
|---|---|---|---|---|---|---|---|---|---|---|---|---|---|
| | CTA | 0 | | | 2.5 | | | 4 | | | 6 | | |
| Ex | (%) | GC | PS20 | SS | GC | PS20 | SS | GC | PS20 | SS | GC | PS20 | SS |
| 2 | 0 | 61.4 | 3.8 | — | 68.4 | 3.2–4 | — | 64.8 | 2.45 | — | 67.5 | 1.85 | — |
| 3 | 0.03 | 1.2 | 2.0 | 12.3 | 54.8 | 3.75 | 11.4/14.2 | 66.4 | 3.4 | 27/37 | 69.1 | 3.25 | — |
| 4 | 0.04 | 0.2 | 1.85 | 1.1 | 46.7 | 3.1 | 3.4/3.0 | 58.9 | 2.95 | 5.7/7.0 | 59.3 | 3.15 | — |
| 5 | 0.05 | 0.1 | 1.4 | 0.6/0.8 | 57.5 | 2.75 | 1.6/1.9 | 60.9 | 2.7 | 3.4/3.9 | 61.6 | 3.25 | 57 |
| 6 | 0.075 | 0.1 | 1.25 | 0.5/0.6 | 4.5 | 2.4 | 1.2/1.3 | 36.5 | 2.05 | 1.1/1.2 | 62.3 | 3.05 | 9.1/12.5 |
| 7 | 0.1 | 0.2 | 0.9 | 0.4 | 1 | 1.3 | 0.5/0.6 | 29.8 | 1.4 | 0.6/0.7 | 48.5 | 2.25 | 2.8/3.0 |

The above shows that without CTA, PS20 drops from an acceptable 3.8 to unacceptable 1.8 as radiation dosage increases from 0 to 6 Mrad. At 0.03% CTA, PS20 at 0 dosage is too low at 2.0 but increases to an acceptable 3.25 to 3.75 at 2.5 to 6.0 Mrad. Similar acceptable PS20 results are obtained at CTA concentrations up to 0.75%. SS decreases as CTA concentration increases at constant E-beam dosage, and increases with increasing E-beam dosage at constant CTA concentration. GC increases with increasing E-beam dosage and decreases with increasing CTA concentration. The lowest 2.5 Mrad dosage significantly increases GC for samples containing CTA in comparison with GC of the latter without irradiation. From the foregoing, those skilled in the art will be able to adjust CTA concentration to reduce GC of the resin to an extent effective to counteract its gain after exposure to sterilizing dosages of 2.5 to 6 Mrad radiation. The gel content chosen should result in a balance between shear and peel adhesion after exposure. In this regard if peel is too low, the pressure sensitive resin won't remain on the surface whereas if too high, it tends to release when pulled with only slight force. When shear is too high, the pressure sensitive resin is too brittle whereas if too low, it releases with low pull force. To provide an acceptable balance of these properties, generally the gel content before irradiation (0 dosage) for pressure sensitive resins according to the invention should preferably be less than 1.5% at CTA concentrations greater than 0 up to about 2%.

Though the foregoing Examples are specific to emulsion polymerized pressure sensitive resins, using CTA to compensate for property deficiencies imparted by irradiation is applicable to solution polymerized acrylate polymers where crosslinking agents are omitted in preparing the PSA.

EXAMPLE C1

This control example is not according to the invention and shows the effect of radiation on resin properties when radical scavenging additives are used which are intended to counteract the effects of radiation.

PSA's are prepared according to Example 1 except in the presence of various additives described below instead of CTA. Such additives (weight % based on the total formu-

| T-123 Conc. | PL20 | | Shear Strength | |
|---|---|---|---|---|
| % | Before E-B | After E-B | Before E-B | After E-B |
| 0 | 5.0/5.2 | 2.3 | 1.6/1.4 | 61.5/63.5 |
| 0.5 | 4.6/4.7 | 2.5 | 1.7 | 35.9 |
| 1.0 | 5.3 | 2.0/2.2 | 1.6 | 34.9/27.0 |
| 1.5 | 4.8/5.0 | 1.7/1.8 | 1.4 | 3.3/3.0 |

From the above, peel strength unacceptably deteriorates and shear strength unacceptably increases (too brittle at higher values) after electron beam irradiation.

Similar results are obtained wherein, instead of Tinuvin 123, the additive is Tinuvin 765 or various Aquamix®'s from Harwick Chemical Corp.—i.e. Aquamix 150 or 474 or 475 which are antioxidants and radical scavengers.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. A method of improving the strength properties of acrylic-based pressure sensitive resins exposed to sterilizing radiation which comprises:

using, during emulsion interpolymerization of the monomers of the resin, an amount of chain transfer agent adequate to reduce the gel content of the resin to no more than about 2% to counteract the gain in gel content occurring after exposure to such radiation.

2. The method of claim 1 wherein the reduction is about 90 to 100% of the gain after irradiation.

3. The method of any of claims 1, or 2 wherein the amount of chain transfer agent is more than 0 up to about 2 weight %, based on the weight of interpolymerizable monomers.

4. The method of claim 3 wherein the amount of chain transfer agent is 0.01 to 0.1 weight %.

* * * * *